United States Patent
Hörnig et al.

[15] 3,693,726
[45] Sept. 26, 1972

[54] TIGHTENING DEVICE FOR AUTOMATICALLY TIGHTENING BOLTS AND THE LIKE

[72] Inventors: Rudolf Hörnig, Hofingen, Wurttenberg; Siegfried Sailer, Grossheppach, Wurttemberg, both of Germany

[73] Assignee: Daimber-Benz Aktiengesellschaft, Germany

[22] Filed: Sept. 17, 1970

[21] Appl. No.: 72,978

[52] U.S. Cl. ..................................... 173/12, 29/240
[51] Int. Cl. .................................................. B23p 19/06
[58] Field of Search ........................... 173/12; 29/240

[56] References Cited

UNITED STATES PATENTS

| | | |
|---|---|---|
| 3,315,754 | 4/1967 | Holdo et al. ................ 173/12 |
| 3,344,865 | 10/1967 | Kitchen et al. .............. 173/12 |
| 3,401,754 | 9/1968 | Loofbourrow ................ 173/12 |

*Primary Examiner*—Ernest R. Purser
*Attorney*—Craig, Antonelli & Hill

[57] ABSTRACT

A device for automatically tightening threads of a threaded connection, in which the threads of, for example, bolts are adapted to be tightened in such a manner that a yielding of the material occurs in the shanks of the bolts; the device is provided with a measuring installation which measures, when the yield point is reached, by the change of the tightening torque of as function of the change of the rotation of the bolt and then turns off the device for tightening the bolt.

29 Claims, 8 Drawing Figures

PATENTED SEP 26 1972　　3,693,726

INVENTORS
RUDOLF HÖRNIG
SIEGFRIED SAILER
BY Craig, Antonelli, Stewart & Hill
ATTORNEYS

TIGHTENING DEVICE FOR AUTOMATICALLY TIGHTENING BOLTS AND THE LIKE

The present invention relates to a tightener for the automatic tightening of bolts, screws or the like of a threaded connection, e.g., of a bolted connection, which is adapted to be tightened in such a manner that a flowing or yielding of the material occurs in the threaded shanks.

In order to obtain an optimum dimensioning of a threaded connection with due regard to costs, weight and space conditions, there exists the requirement for a high exploitation of the elastic limit of each bolt and for as small as possible a deviation of the prestress of the individual bolts. It is known in connection therewith to tighten the bolts to a predetermined torque. Since, however, large frictional differences may occur, one obtains with this method a strongly deviating prestress. To an ever-increasing extent one therefore goes over to a tightening of the bolts to such an extent that a flowing or yielding occurs in the bolt shanks. The deviation of the prestress thereby depends essentially only on the deviation of the yield point of the bolt shank. This deviation of the prestress is then considerably smaller than with the tightening of the bolts to a predetermined torque. Additionally, the bolts can be utilized more strongly since with the same bolt shank diameter, a higher prestress force is possible.

The known automatic fastening or tightening devices, by means of which the tightening of bolts in threaded (bolted) connections is carried out to such an extent that a yielding occurs in the bolt shanks, operate in two steps. At first, the bolts are tightened to a predetermined torque up to the seating of the connection whereupon a further rotation through a predetermined angle of rotation is carried out. The rotary angle has to be so dimensioned in connection therewith that all bolts reach with certainty a flowing or yielding, i.e., the yield point, for the most part, has to be exceeded by far. However, the re-usability of the bolts is thereby strongly reduced and limited since with a repeated tightening of this kind into the yielding of the material, the permanent deformation within the bolt shank becomes excessive.

The automatic tightening devices of the aforementioned type additionally entail the disadvantage that for each threaded connection a separate instruction or specification has to be determined concerning the rotary angle to be provided, i.e., concerning the second step of the tightening operation, since this rotary angle is dependent on the overall spring constant of the connection.

The present invention is concerned with the task to avoid these disadvantages with tightening devices of the aforementioned type and to achieve that the tightening device is turned off as soon as the yield limit is reached. As a result thereof, the permanent elongations of the bolt can be kept small whereas additionally complicated tightening specifications can be dispensed with. The present invention essentially consists in that the tightening device is provided with a measuring installation which measures the attaining of the yield point by means of the change of the tightening torque in dependence on the change of the rotation of the bolt and which turns off or disengages the tightening device upon reaching a limit value.

Such a measuring installation measures the slope of the tightening torque plotted as a curve against the bolt rotation which has a well recognizable characteristic shape. One utilizes in connection therewith the fact that starting with reaching the yield point, relatively large bolt rotations are connected with only still small increases of the tightening torque.

In an extraordinarily advantageous manner, an elastic element may be arranged between the bolt-drive and the bolt-head and the measuring installation may measure the change of the torsion or twisting of this elastic element. The torsion or twist of the elastic element is proportional to the tightening torque. In a structurally simple manner, the measuring installation may be equipped with one or several rotational speed measuring means or angle measuring means of any conventional type which measure the change of the twist or torsion of the elastic member as a function of the rotational speed changes or angular changes ahead of and behind the elastic element. The measurement of the change of the twist is thus made possible in an extraordinarily advantageous manner by means of a more simple rotational speed or angle measurement.

In order not to have to measure at the same time the second derivative of the tightening torque as a function of the rotary angle of the bolts, and in order to obtain nonetheless unequivocal results, the measuring installation may include a switch which starts the measurement of the change of the twist or torsion in dependence on a predetermined tightening moment or a predetermined twisting of the elastic member. As a result thereof, the starting point is displaced so far that measuring ambiguities or equivocations of the first derivative are excluded.

In order not to break down the threads of the bolts in case of wear or seizing of individual threads, the measuring installation may include a limit switch and/or a warning apparatus which respond to an excessive increase of the tightening torque. By adjusting such a switch to a predetermined value, the tightening device may be utilized in special cases with this type of construction also for the tightening to a predetermined torque (for example, during tightening in several assembly stages or steps).

In a structurally, most appropriate manner, the measuring installation of the present invention may also be constructed as connecting apparatus for the tightening device adapted to be series-connected in its input. The possibility results therefrom in an extraordinarily advantageous manner that the known tightening devices used heretofore can be converted by such a series-connected apparatus.

The measuring installation may include in one embodiment of the present invention a gear or transmission which engages in front of and to the rear of the elastic element and which produces a rotational speed changing with the twist which is monitored by means of a rotational speed measuring device that produces a signal effecting the turning off of the tightening device upon attaining an intended value. Operating in a similar manner, an electrical or electronic measuring installation may be provided in lieu thereof so that a mechanical rotational speed measurement takes place in that a centrifugal-force switch or an acceleration switch is connected in the output of a transmission engaging in front of and to the rear of the elastic element, preferably by the interposition of further speed increase or speed reduction gearing stages, which is adjusted to a predetermined intended value.

In another embodiment of the present invention, the measuring installation may include two rotational speed measuring devices which measure the angular velocity in front of and to the rear of the elastic element that are fed to an analog computer that compares a value formed from the angular velocities with an intended value.

In a further embodiment of the present invention, the output of a gear or transmission engaging in front of the elastic element and to the rear of the elastic element as well as a place to the rear of the elastic element may be connected with pulse transmitters which feed the pulses by way of conventional pulse shapers to a counter that counts the pulses associated with the twist angle and carries out with each pulse associated with or belonging to the bolt rotation, a comparison with a stored limit value, subsequently is erased and started anew. In order to be able to economize the constant comparison, it is appropriate if the output of a gear or transmission engaging in front of and to the rear of the elastic member is connected with a pulse transmitter that feeds the pulses by way of a pulse shaper to a binary counter as erasing and starting pulse, which counts the pulses that are supplied thereto by way of a pulse transmitter connected to the rear of the elastic element and of an interposed pulse shaper, and which in case of an overrun turns off the tightening device. It is utilized in connection therewith that the ratio of the change of the bolt rotation to the change of the torque possesses a maximum value as limit value whereby the comparison with the limit value can be dispensed with. Appropriately, the overrun of the binary counter may be adjustable.

Accordingly, it is an object of the present invention to provide a tightening device for automatically tightening bolts and the like which eliminates a strong dispersion of the prestress force notwithstanding strong frictional differences in the parts to be connected.

A further object of the present invention resides in a tightener for automatically tightening bolts and the like which is simple in use and does not require separate programming for each operation involving different types of bolts.

Still another object of the present invention resides in a tightening device for automatically tightening bolts and the like which assures reliable, unequivocal operation, is simple in construction and easy to handle.

These and further objects, features and advantages of the present invention will become more obvious from the following description when taken in connection with the accompanying drawing which shows, for purposes of illustration only, several embodiments in accordance with the present invention, and wherein.

Figure 1:
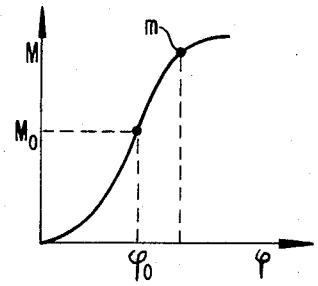
FIG. 1 is a graphic view of the curve of the tightening moment as a function of the overall rotation of the bolt.
Figure 2:
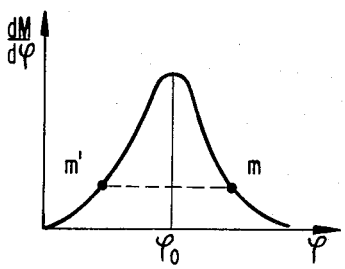
FIG. 2 is a curve illustrating the slope of the curve according to FIG. 1, plotted as a function of the overall rotation of the bolt.

Referring now to the drawing wherein like reference numerals are used throughout the various views to designate like parts, and more particularly to FIG. 1, as illustrated in this figure, the shape of the curve of the tightening moment M plotted as a function of the angle of rotation $\phi$ of the associated bolts has a characteristic shape. At first, the curve rises relatively flat, i.e., relatively slowly, then possesses a linear portion and subsequently thereto again passes over into a relatively flat or slowly rising part upon attaining the yield point $m$. The first derivative illustrated in FIG. 2 represents this characteristic shape whereby it can be seen additionally from this figure that the slope corresponding to the yield point $m$ occurs once more in the first part of the curve at the point $m'$.

One utilizes by the proposal in accordance with the present invention that the characteristic curve of the tightening moment M over the angle of rotation $\phi$ is similar in connection with all bolts, independently of the diameter thereof and therewith of the absolute value of the tightening moment. In order to determine the attainment of the yield point $m$ and therewith to turn off the automatic tightening device, the slope of this characteristic curve is measured which indicates the beginning of the flowing or yielding of the material, independently of the absolute magnitude of the tightening moment. Since the slope corresponding to the yield point $m$ occurs twice, it is appropriate, in order not to have to measure also the second derivative of the curve at the same time, if the measurement, properly speaking, of the slope is started after exceeding or passing over this area, for example, if the measurement is begun only at point $\phi_0$ of the linear part of the curve. The slope is determined as a function of the twist $\alpha$ of an elastic element 1, for example, of a measuring spring with a spring constant C, which is arranged between the indicated tightener drive 2 of any known conventional construction and the bolt head (also not shown) of the bolt to be tightened, and as a function of the overall rotation which corresponds to the angle of rotation $\phi$ of the bolt. The following mathematical equation results therefrom whereby the overall rotation in front of, i.e., upstream of the elastic member is designated by $\phi_1$ and the overall rotation to the rear of, i.e., downstream of the elastic member 1 is designated by $\phi$:

$$\frac{dM}{d\varphi} = C\frac{d\alpha}{d\varphi} = C\frac{d(\varphi_1 - \varphi)}{d\varphi} = C\frac{d\varphi_1 - \varphi}{dt} \cdot \frac{1}{\frac{d\varphi}{dt}}$$

$$\frac{dM}{d\varphi} = C\frac{\omega_1 - \omega}{\omega} \text{ or } \frac{dM}{d\varphi} = C\frac{\omega\alpha}{\omega}$$

Consequently, the derivation of the curve according to FIG. 1 may be determined from the velocities $\omega$, $\omega_1$ and $\omega_\alpha$ of the measurable angles $\phi$, $\phi_1$ and $\alpha$. The terms "in front of" or "upstream of" of a specified part and the terms "to the rear of" or "downstream of" a specified part are used in the specification and claims herein to refer to the part in relation to the normal direction of flow of power through such part.

Figure 3:
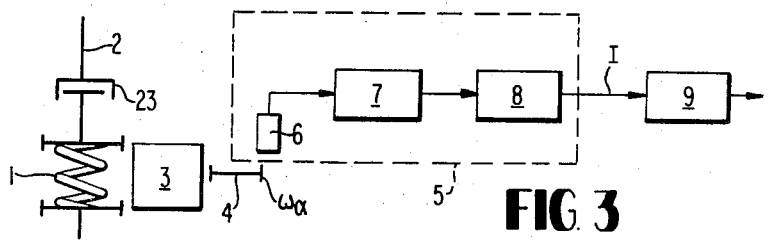
FIG. 3 is a schematic view of a first embodiment of a measuring installation for measuring the slope according to FIG. 2.

In the embodiment according to FIG. 3, it is presupposed that the overall rotation $\phi$ of the elastic element 1 and therewith the angular velocity $\omega$ of the bolt head (not shown) is constant during the tightening. This simplification applies in most cases with sufficient accuracy. Consequently, only the twisting $\alpha$ of the elastic member 1 is measured in that a transmission 3, only schematically indicated and of any conventional construction, is provided which engages at the tightening device in front or upstream of and to the rear or downstream of the elastic element 1 and transforms the change of the twist $\alpha$ into a rotary movement at a wheel 4 in its output. A conventional electronic rotational speed measuring device 5 is connected to this output which consists of a conventional pulse transmitter 6 with a conventional pulse shaper 7 adjoining the same, whose output is conventionally integrated at 8 and then produces a current I which is fed to a device 9 of any conventional construction that produces a signal when the current I approaches 0, that in turn brings about the turning off or disengagement of the tightener. In lieu of the electronic installation, also a mechanical installation may be utilized which consists of a centrifugal force or acceleration switch that may be connected to the output of the gear 3 and that responds to the twisting $\alpha$ of the elastic element 1 converted into a rotary movement.

Figure 4:
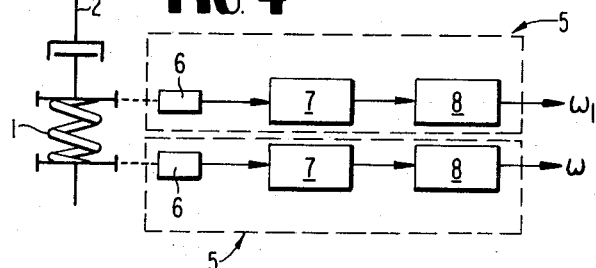
FIG. 4 is a schematic view of a further embodiment of a measuring installation for measuring the slope in accordance with the present invention.

In the embodiment according to FIG. 4, the change of the twist $\alpha$ is measured in dependence on the overall rotation $\phi$ by way of two rotational speed measuring devices 5 corresponding to FIG. 3 which engage at the tightener in front of and to the rear of the elastic element 1. These rotational speed measuring devices 5 measure therefore the angular velocity $\omega_1$ in front or upstream of the elastic member 1 and the angular velocity $\omega$ of the overall rotation to the rear or downstream of the elastic element 1. Analog computers 10 or 11 corresponding to FIGS. 5 and 6 may be connected to these rotational speed measuring devices 5.

Figure 5:
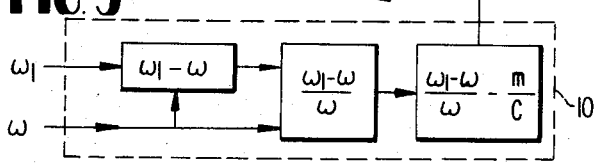
FIG. 5 is a schematic view of an analog computer associated with the measuring installation according to FIG. 4.
Figure 6:
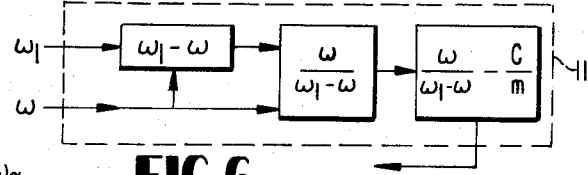
FIG. 6 is a schematic view of a further embodiment of an analog computer possible for the measuring installation according to FIG. 4.

In the embodiment according to FIG. 5, at first the difference $\omega_1 - \omega$ of the two measured angular velocities is formed in the analog computer 10 which is then divided by the angular velocity $\omega$ of the overall rotation $\phi$ and subsequently thereto is compared with an intended value $m/C$ formed from the yield point $m$ and the spring constant $C$. This intended value $m/C$ formed by the ratio of the yield point and of the spring constant is subtracted from the previously formed ratio of the angular velocity, and as soon as these two values approximately correspond to one another, the tightener is turned off by conventional means. As illustrated in FIG. 6, it is also possible to form the ratio of the angular velocity $\omega$ of the overall rotation $\phi$ to the difference of the angular velocities $\omega_1 - \omega$ and subsequently to compare the same with an intended value $C/m$ formed from the spring constant $C$ and the yield point $m$. It is appropriate in both embodiments to select the spring constant $C$ as small as possible in order to obtain the largest possible angular difference $\omega_1 - \omega$.

Figure 7:
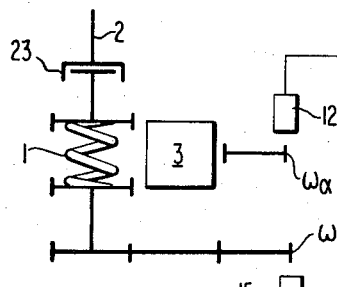
FIG. 7 is a schematic view of a further embodiment of a measuring installation in accordance with the present invention.

In the embodiment according to FIG. 7, the angular velocities of interest $\omega_\alpha$ and $\omega$ are measured by digital means. The twisting $\alpha$ of the elastic member 1 is converted into a rotary movement by a conventional transmission 3 engaging in front or upstream and to the rear or downstream of the elastic element 1, which rotary movement is sensed or detected by a pulse transmitter 12 of conventional construction whose pulses control a binary counter 14 by interposition of a pulse shaper 13. The angular velocity $\omega$ of the overall rotation $\phi$ is also sensed or detected by a conventional pulse transmitter 15 whose pulses are also fed to the binary counter 14 by interposition of a pulse shaper 16. A switch 17 is provided between the pulse shaper 16 and the binary counter 14 which turns on the measuring installation automatically in dependence on a predetermined tightening torque $M_0$ (measured by $\alpha_0$) which lies with certainty within the linear range of the curve illustrated in FIG. 1.

The pulses received in dependence on the twist $\alpha$, control the binary counter 14 in that one pulse each erases the counter 14 and simultaneously starts the same again whereas the pulses dependent on the overall rotation $\phi$ are counted by the binary counter 14. The magnitude $(\Delta \phi)/\Delta M)$ is formed thereby which possesses as limit value a maximum value and therewith greatly simplifies the comparison of the counter 14 with the limit value. An over-run device 18 of any conventional construction is connected to the binary counter 14 which produces a control signal for turning off the tightener as soon as a sufficient number of pulses of the over-all rotation $\phi$ are counted in the binary counter between two pulses initiated by the twisting. The over-run device 18 is appropriately adjustable so that several limit values can be adjusted. It would also be possible to utilize the pulses of the pulse transmitter 15 as control pulses whereas the pulses of the pulse transmitter 12 are counted. In this case, the magnitude $(\Delta M)/(\Delta \phi)$ would be formed which would have to be compared after each control pulse with a limit value since it does not reach any maximum value.

Figure 8:
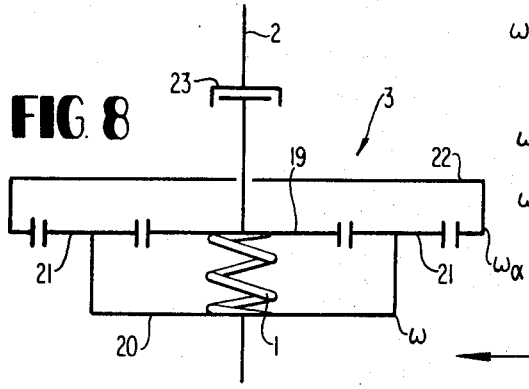
FIG. 8 is a schematic view, on an enlarged scale, illustrating certain details of FIGS. 4 and 7.

In FIG. 8 is illustrated, for example, a planetary gear or transmission which may be used in connection with the measuring installations according to FIGS. 3 and 7 as transmission for the measurement of the torsion or twist $\alpha$. The elastic element 1, for example, a spring is arranged between the inner or sun gear 19 of this planetary gear which is connected with the tightener drive 2, and the web or planet carrier 20 which is operatively connected with the bolt head (not illustrated). The planet gears 21 of the web 20 drive a ring gear or outer gear 22 whose rotation is proportional to the twist $\alpha$ of the elastic member whereas the movement of the web 20 corresponds directly to the overall rotation $\phi$ of the elastic element 1. As mentioned hereinabove, the angles $\phi$, $\phi_1$ and $\alpha$ and the angular velocities $\omega$, $\omega_1$ and $\omega_\alpha$ of interest may be measured at this planetary gear by means of simple rotational speed measuring devices 5.

In all of the measuring installations according to FIGS. 3, 4 and 7, switches may be included which register an excessively strong tightening torque M and which are possibly connected with a conventional warning device or directly turn off the tightener. It is prevented thereby that in case of seizing of a bolt, this bolt is broken off. The tightening moment or the corresponding twist triggering the switch are appropriately adaptable in each case to the bolt sizes and materials to be worked.

As is illustrated in the embodiments according to FIGS. 3, 4, 7 and 8, the measuring installation containing the elastic element 1 is connected with the tightener drive 2 by means of a conventional clutch 23. These measuring installations, especially the electronically operating measuring installations, may be constructed extraordinarily small and compact so that it is possible without difficulty to construct the same as a series-connected input device for the tightener. It becomes possible thereby to equip also the heretofore customary tighteners according to the present invention.

While we have shown and described several embodiments in accordance with the present invention, it is obvious that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A tightening device for automatically tightening the threads of a threaded connection, which threads are adapted to be tightened in such a manner that a yielding of the material occurs in the parts containing the threads, characterized in that the device includes measuring means operable to determine the approach to the yield point by measuring the change of the tightening torque in dependence on the change of the relative rotation of the threads, and means operatively associated with said measuring means for turning off the tightening device when the yield point is substantially reached.

2. A device according to claim 1, characterized in that the part containing the threads is the shank of a bolt or the like.

3. A device according to claim 2, characterized in that an elastic means is provided between a drive means for the device and the bolt head and in that the measuring means measures the change of the twist of said elastic means.

4. A device according to claim 3, characterized in that the measuring means includes at least one rotational speed measuring device which measures the change of the twist of the elastic means in front of and to the rear of the elastic means against the rotational speed changes.

5. A device according to claim 4, characterized in that several rotational speed measuring devices are provided.

6. A device according to claim 4, characterized in that the measuring means includes switch means operable to start the measurement of the change of the twist in dependence of a predetermined tightening torque.

7. A device according to claim 4, characterized in that the measuring means includes a switch means operable to start the measurement of the change of the twist in dependence of a predetermined twist of the elastic means.

8. A device according to claim 4, characterized in that the measuring means included a limit switch means which responds to an excessive increase of the tightening torque.

9. A device according to claim 8, characterized in that the measuring means includes a warning means that responds to an excessive increase of the tightening torque.

10. A device according to claim 3, characterized in that the measuring means includes a warning means that responds to an excessive increase of the tightening torque.

11. A device according to claim 4, characterized in that the measuring means is constructed as an input apparatus adapted to be series-connected in the input of the tightening device.

12. A device according to claim 3, characterized in that the measuring means includes a gear means which engages in front of and to the rear of the elastic means and produces a rotational speed changing with the twist, which is monitored by way of a rotational speed measuring means operable to produce upon reaching an intended value a signal causing said device to be turned off.

13. A device according to claim 3, characterized in that a switch means is connected to the output of a gear means engaging in front of and to the rear of the elastic means, said switch means being adjustable to a predetermined intended value.

14. A device according to claim 13, characterized in that said switch means is a centrifugal switch.

15. A device according to claim 13, characterized in that said switch means is an acceleration switch.

16. A device according to claim 13, characterized in that said gear means engages said elastic means by way of further speed-change reduction gear means.

17. A device according to claim 13, characterized in that said gear means engages at the output of said elastic means by way of further speed increase gear means.

18. A device according to claim 3, characterized in that the measuring means includes two rotational speed measuring devices which measure the angular velocity in front of and to the rear of the elastic means, the outputs of said rotational speed-measuring devices being fed to an analog computer operable to compare a value obtained from the angular velocities with an intended value.

19. A device according to claim 3, characterized in that the output of a gear means engaging in front of and to the rear of the elastic means as well as a place located to the rear of the elastic means are operatively connected with a pulse transmitter means which feeds the pulses by way of a pulse shaper means to a counter means operable to count the pulses associated with the twist angle, and which carries out a comparison with a correspondingly stored limit value by each pulse associated with the over-all rotation, and subsequently is erased and started anew.

20. A device according to claim 3, characterized in that the output of a gear means operatively connected in front of and to the rear of the elastic means is operatively connected with a pulse transmitter means which feeds the pulses thereof by way of a pulse shaper means to a counter means as canceling and starting pulses, said counter means counting the pulses which are fed thereto by way of a pulse transmitter means connected to the rear of the elastic means and fed thereto by way of an interposed pulse shaper means and which is operable to turn off the device in case of overrun.

21. A tightening device according to claim 20, characterized in that the overrun of the counter means is adjustable.

22. A device according to claim 3, characterized in that the measuring means includes switch means operable to start the measurement of the change of the twist in dependence of a predetermined tightening torque.

23. A device according to claim 3, characterized in that the measuring means includes a switch means operable to start the measurement of the change of the twist in dependence of a predetermined twist of the elastic means.

24. A device according to claim 1, characterized in that the measuring means includes a limit switch means which responds to an excessive increase of the tightening torque.

25. A device according to claim 1, characterized in that the measuring means includes a warning means that responds to an excessive increase of the tightening torque.

26. A device according to claim 1, characterized in that the measuring means is constructed as an input apparatus adapted to be series-connected in the input of the tightening device.

27. A tightening device for automatically tightening the threads of a threaded connection between two threaded parts in such a manner that a yielding of the material occurs in the parts containing the threads; said device comprising: tightening means for applying a tightening moment to the threaded connection, measuring means for determining when said threaded connection is approaching the yield point, said measuring means including means for determining the first derivative of the tightening moment with respect to the relative angular rotation of the threaded parts, and means responsive to said measuring means for turning off the tightening means when a predetermined first derivative corresponding to the yield point of the threaded connection is substantially reached.

28. A device according to claim 27, wherein the measuring means includes switch means operable to start the measurement of the first derivative after a predetermined tightening torque is reached, whereby the inadvertent turning off of the tightening means upon the first occurrence of the predetermined first derivative is prevented, said first occurrence occurring at a significantly lower tightening torque than the torque corresponding to the yield point.

29. A device according to claim 27, wherein an elastic means is interposed between said tightening means and one of the parts of the threaded connection, said measuring means including means for measuring the change of the twist of said elastic means.

* * * * *